(12) United States Patent
Göras

(10) Patent No.: US 7,997,160 B2
(45) Date of Patent: Aug. 16, 2011

(54) CONTROL ARRANGEMENT AND GEARBOX

(75) Inventor: Erik Göras, Solna (SE)

(73) Assignee: Scania CV AB (PUBL) (SE)

( * ) Notice: Subject to any disclaimer, the term of this patent is extended or adjusted under 35 U.S.C. 154(b) by 394 days.

(21) Appl. No.: 12/298,376

(22) PCT Filed: Apr. 11, 2007

(86) PCT No.: PCT/SE2007/050232
§ 371 (c)(1),
(2), (4) Date: Nov. 3, 2008

(87) PCT Pub. No.: WO2007/123477
PCT Pub. Date: Nov. 1, 2007

(65) Prior Publication Data
US 2009/0090205 A1    Apr. 9, 2009

(30) Foreign Application Priority Data

Apr. 26, 2006   (SE) ...................................... 0600906

(51) Int. Cl.
*B60K 20/00*    (2006.01)
*G05G 1/06*    (2006.01)
(52) U.S. Cl. ........................................ 74/473.1; 74/527
(58) Field of Classification Search ........................ None
See application file for complete search history.

(56) References Cited

U.S. PATENT DOCUMENTS

| | | |
|---|---|---|
| 3,164,030 A | 1/1965 | Fodrea et al. |
| 4,570,776 A | 2/1986 | Iwashita et al. |
| 5,310,370 A | 5/1994 | Onoue |
| 7,836,787 B2 * | 11/2010 | Oguma ........................ 74/473.1 |

FOREIGN PATENT DOCUMENTS

EP    0702172 A1    3/1996

OTHER PUBLICATIONS

International Search Report dated Jun. 13, 2007, issued in corresponding international application No. PCT/SE2007/050232.

* cited by examiner

*Primary Examiner* — Dirk Wright
(74) *Attorney, Agent, or Firm* — Ostrolenk Faber LLP

(57) ABSTRACT

The invention relates to a control device for controlling the engagement of selected gears of a gearbox for a motor vehicle, which control device comprises a control rod with a respective locking arrangement. The locking arrangement includes a locking element provided with one or more grooves or recesses which each define a predetermined setting position of the control rod. The locking arrangement further includes two locking balls, a control ball and a spring arranged in a hollow space in the control rod. The locking balls are movable radially in the hollow space in mutually opposite directions, perpendicular to the control rod's longitudinal axis, against the action of the spring in order for the locking balls to be brought into and out of engagement with the grooves/recesses. The control ball is movable in the hollow space in the control rod's axial direction and is preloaded by the spring against the locking balls so that the locking balls, through the action of the spring and the control ball, are thereby preloaded to assume a protruded position in order to engage in one of the grooves/recesses. The invention also relates to a gearbox including such a control device.

9 Claims, 3 Drawing Sheets

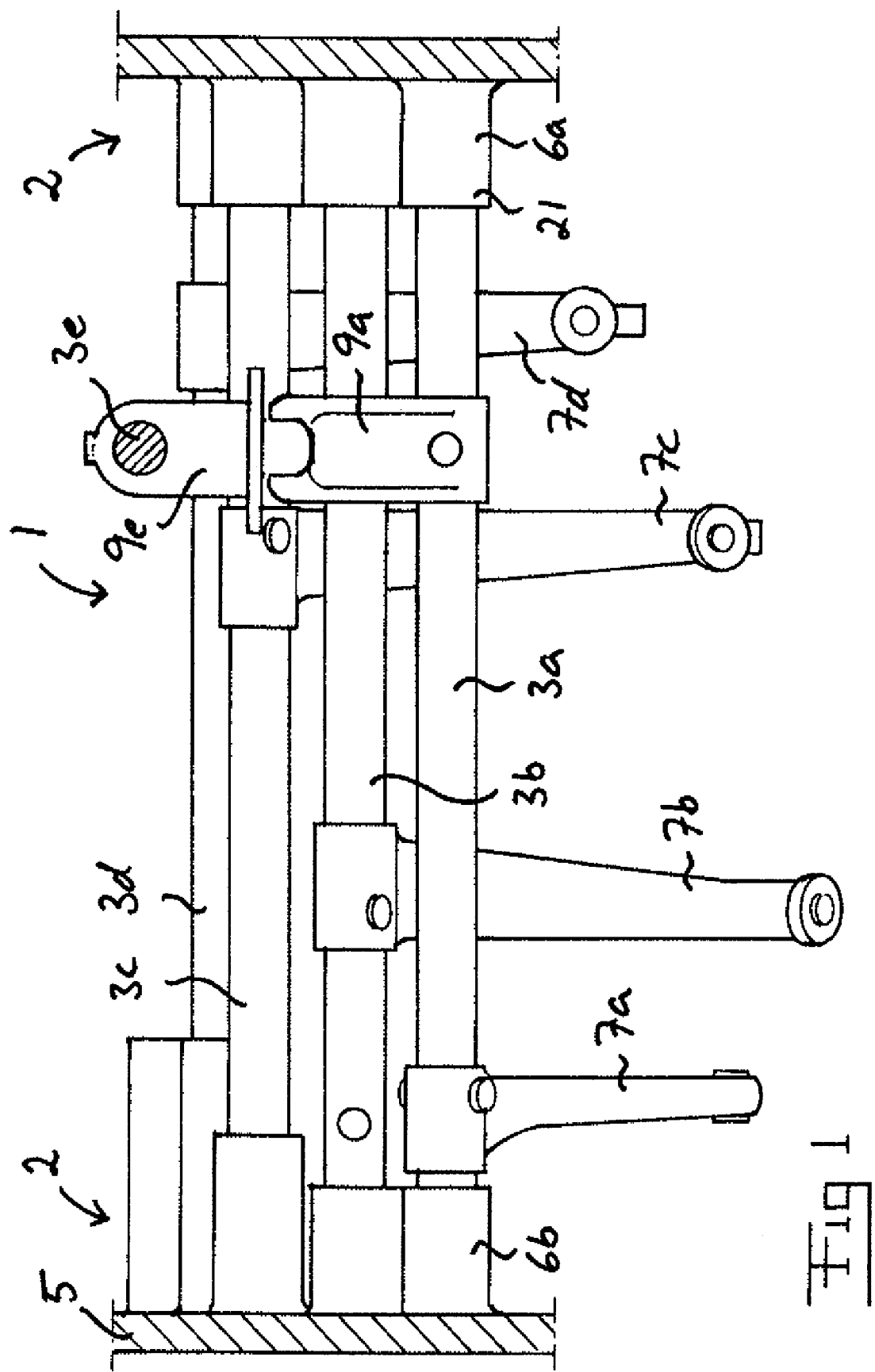

CONTROL ARRANGEMENT AND GEARBOX

CROSS REFERENCE TO RELATED APPLICATION

The present application is a 35 U.S.C. §§371 national phase conversion of PCT/SE2007/050232, filed 11 Apr. 2007, which claims priority of Swedish Application No. 0600906-2, filed 26 Apr. 2006 incorporated herein by reference. The PCT International Application was published in the English language.

FIELD OF THE INVENTION AND STATE OF THE ART

The present invention relates to a control device with a position locking arrangement for controlling the engagement of desired gears of a gearbox for a motor vehicle, and a gearbox comprising such a control device.

In a manual gearbox of a motor vehicle, e.g. a passenger car, a truck, a tractor vehicle for semitrailers or a bus, the engagement of desired gears is usually controlled by a control device which forms part of the gearbox and is provided with a plurality of control rods. These control rods can, by operation of the vehicle's gear lever, be moved between various predetermined setting positions which define the various gear positions of the gearbox. Each control rod cooperates with a locking arrangement which ensures that the control rod will assume one of the predetermined setting positions in response to movement of the gear lever and that the control rod is not unintentionally shifted from the relevant setting position. EP 0 702 172 A1 refers to a conventional type of locking arrangement for a control rod of a gearbox. This locking arrangement comprises a locking means which, through the action of a spring means, is adapted to engaging in various recesses of the control rod. Each of these recesses corresponds to a predetermined setting position of the control rod. Each recess has a guide surface adapted to cooperating with the locking means in such a way that the locking means, through the action of this guide surface and against the action of the spring means, will move from a protruded position to a retracted position in response to an axial movement of the control rod starting from a setting position of the control rod with the locking means engaged in the respective recess. Changing from one setting position to another thus entails the control rod being moved in its longitudinal direction with sufficient force to overcome the spring force from the spring means which, via the locking means, counteracts such movement. When the control rod has been moved so far that another of these recesses arrives in way of the locking means, the locking means will, through the action of the spring means, move forward to engage with that recess and thereby counteract further movement of the control rod. By means of these locking functions, the person operating the gear lever receives via the respective control rod and the gear lever a perception of the various gear positions.

OBJECT OF THE INVENTION

The object of the invention is to provide a further development of a control device of the type indicated above in order to propose a configuration which in at least some respects affords an advantage as compared with a conventionally configured control device.

SUMMARY OF THE INVENTION

According to the present invention, said object is achieved by means of a control device having the features disclosed herein.

According to the invention, the control device comprises at least one control rod with a relating locking arrangement, which locking arrangement comprises a locking element provided with one or more grooves or recesses which each define a predetermined setting position of the control rod, whereby the control rod is arranged for movement relative to the locking element. The locking arrangement further comprises:

two locking balls arranged in a hollow space in the control rod, whereby these locking balls are movable in the hollow space in mutually opposite directions, perpendicular to the longitudinal axis of the control rod, against the action of a spring means arranged in the hollow space between a protruded position in which each locking ball engages in one of said grooves/recesses in the locking element and thereby counteracts movement of the control rod relative to the locking element, and a retracted position in which the locking balls do not engage in any of said grooves/recess in the locking element, and a control ball arranged in said hollow space, movable in the hollow space in the axial direction of the control rod and preloaded by the spring means against the locking balls so that the locking balls, through the action of the spring means and the control ball, are thereby preloaded to assume the protruded position. The control ball is further adapted, through the action of the locking balls and against the action of the spring means, to moving axially in said hollow space in response to movement of the locking balls from the protruded position to the retracted position.

According to the invention, the locking balls, the control ball and the relating spring means are arranged within the actual control rod, thereby rendering the locking arrangement particularly space-saving. The solution according to the invention also makes simplified construction of the control device possible as compared with the conventional solution described above, thus providing the possibility of reduced manufacturing costs. Using locking means in the form of balls and causing them to cooperate with a control ball results in low friction and little wear between the components of the locking arrangement, while at the same time reducing the tolerance requirements for these components. The arrangement with the three balls arranged within the control rod also results in a locking arrangement with good symmetry and balance, thereby avoiding the control rod being subject to bending forces during gear changing. The low friction and the elimination of bending forces lead to very easy gear changing.

According to one embodiment, the locking balls are adapted to holding the control ball in position in said hollow space and the control ball is adapted, through the action of the spring means, to holding the locking balls in position in said hollow space. The need for special fastening means for fitting the locking balls and the control ball in the hollow space of the control rod is thus eliminated, making it possible for the locking arrangement to comprise a small number of components of simple configuration and at the same time to be easy to fit.

Other embodiments of the control device according to the invention are described below.

The invention also relates to a gearbox for a motor vehicle, preferably in the form of a manual gearbox, comprising a control device according to the present invention.

BRIEF DESCRIPTION OF THE DRAWINGS

The invention is described below in more detail on the basis of embodiment examples with reference to the attached drawings, in which:

FIG. 1 depicts a schematic side view of control rods forming part of a control device according to the present invention.

DETAILED DESCRIPTION OF PREFERRED EMBODIMENTS

The control device 1 according to the invention is intended to form part of a gearbox for a motor vehicle in order to control the engagement of desired gears of the gearbox. Apart from the locking arrangements described below, the control device and the relating gearbox may be of conventional and known configuration.

Figure 3:
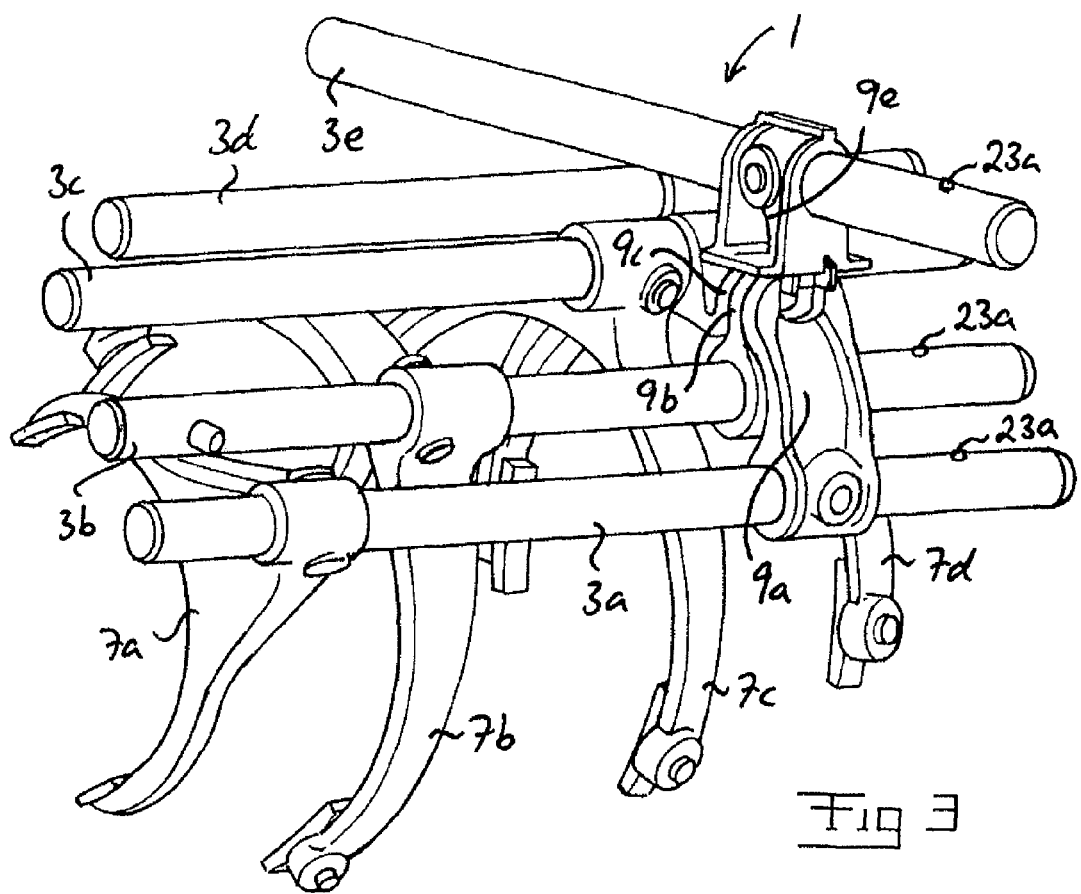
FIG. 3 depicts a schematic perspective view of the control rods according to FIG. 1.

FIGS. 1 and 3 illustrate four control rods 3a-3d arranged for linear movement in a holder unit 2 and forming part of a control device 1 according to the present invention. In FIG. 3, the holder unit is omitted for the sake of clarity. The number of control rods of the control device according to the invention may be either larger or smaller than here illustrated. The holder unit 2 may be integrated in the housing 5 of the relating gearbox, as schematically illustrated in FIG. 1. Each control rod 3a-3d is supported for movement relative to the holder unit 2 in such a way that relative to the holder unit it is movable in its longitudinal direction. Each control rod 3a-3d may be supported relative to the holder unit 2 via, for example, a plain bearing 6a, 6b at each end of the control rod, as illustrated in FIG. 1. Each control rod 3a-3d is connected in a known manner to a gear lever by means of which the control rod 3a-3d can be caused to move relative to the holder unit 2. By operating the gear lever between various predetermined positions, the user, i.e. a driver in a motor vehicle, can place the control rods 3a-3d in desired setting positions relative to the holder unit 2. Each control rod 3a-3d effects in a known manner not here described, via a selector fork 7a-7d, the engagement and disengagement of various predetermined gears of the gearbox. Each selector fork 7a-7d moves together with the relating control rod 3a-3d and acts upon the gear position of the gearbox via a known and not here illustrated control mechanism of the gearbox. Each control rod effects the engagement and disengagement of two different gears of the gearbox. From a neutral position, each control rod 3a-3d can be moved longitudinally in one direction to a predetermined setting position to engage a first of said two gears and in another direction to another predetermined setting position to engage the second of said two gears.

Of the aforesaid control rods, three control rods 3a-3c in the example illustrated are connected to a common control rod 3e, hereinafter called the operating rod. The operating rod 3e is supported for linear and rotary movement relative to the holder unit 2 in such a way that relative to the holder unit it is movable in its longitudinal direction and rotatable about its longitudinal axis. The operating rod 3e is connected in a known manner not here illustrated to a gear lever by means of which the operating rod 3e can be caused to perform linear and rotary movements relative to the holder unit 2. By operating the gear lever between various predetermined positions, the user can move the operating rod 3e in its longitudinal direction and place it in any of a plurality of predetermined linear positions. For each of the control rods 3a-3c, the operating rod 3e has a predetermined linear position. Depending on its linear position, the operating rod 3e is adapted to being able to move one control rod 3a-3c at a time between these predetermined setting positions by being rotated in a desired direction about its longitudinal axis. The control rods 3a-3c are each provided with control means 9a-9c for cooperation with a corresponding control means 9e of the operating rod 3e. Each control means 9a-9c, 9e is firmly connected to the relating rod 3a-3c, 3e. The control means 9e is thus caused to perform linear and rotary movements together with the operating rod 3e, and each control means 9a-9c will move together with the relating control rod 3a-3c. By movement of the operating rod 3e in its longitudinal direction, its control means 9e can be brought into engagement with one at a time of the control means 9a-9c of the control rods 3a-3c. When the operating rod 3e is in a linear position pertaining to a certain control rod 3a-3c, rotary motion of the operating rod 3e is converted to axial linear movement of the respective control rod via mutual engagement between the operating rod's control means 9e and the control rod's control means 9a-9c.

The setting position of the fourth control rod 3d is in the example illustrated not controlled by the operating rod 3e but may, for example, be adapted to being controlled pneumatically in a conventional manner not further described here.

Figure 2A:
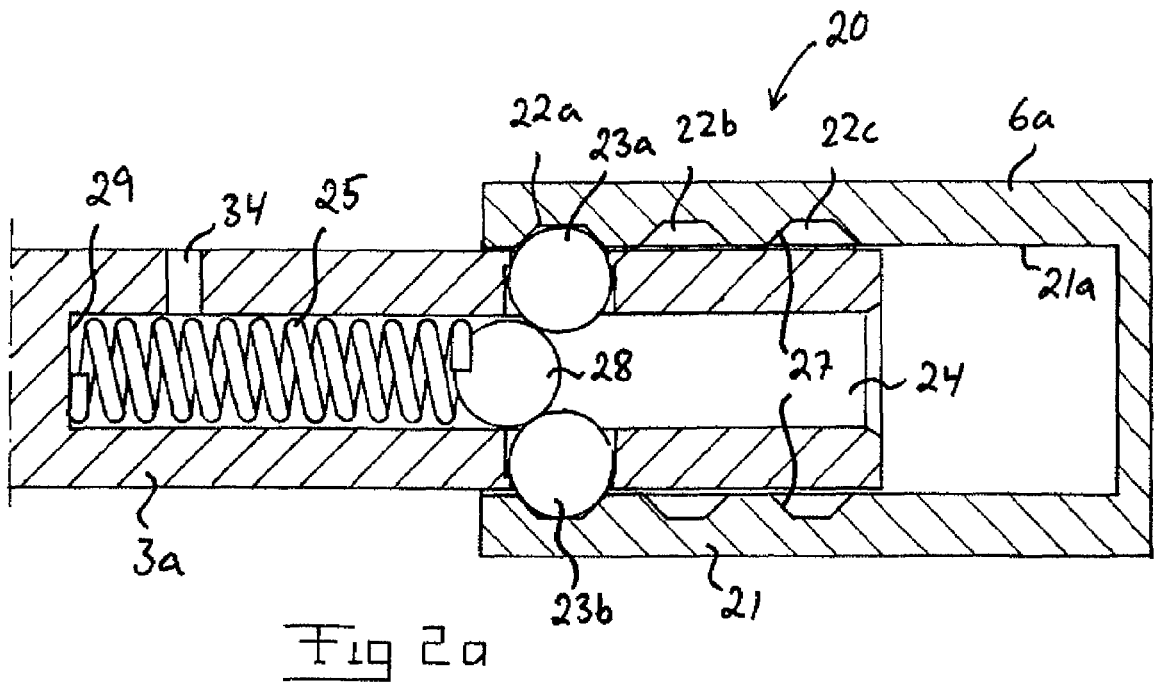
FIG. 2a depicts a schematic longitudinal section through part of a control rod with a relating locking arrangement shown in a locking position.
Figure 2B:
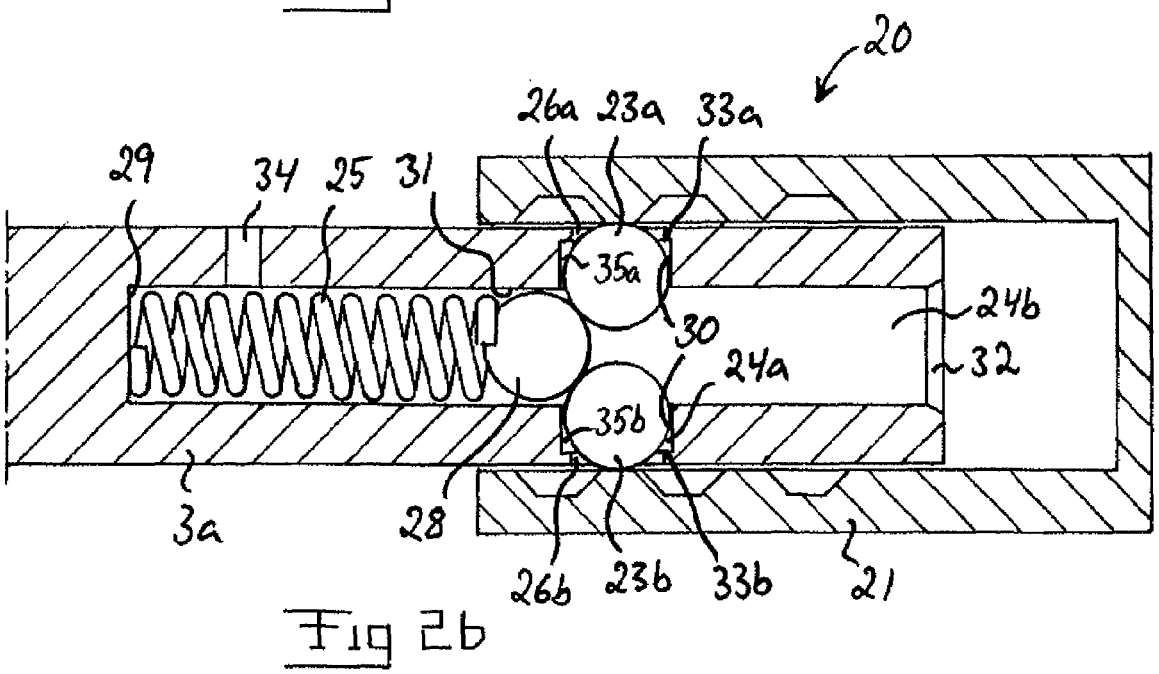
FIG. 2b depicts the longitudinal section according to FIG. 2a with the locking arrangement shown in a non-locking position.

Each of the control device's control rods 3a-3d is allocated a locking arrangement 20 adapted to defining one or more predetermined setting positions of the control rod 3a-3d relative to the holder unit 2. FIGS. 2a and 2b depict part of a control rod 3a with such a locking arrangement 20. The locking arrangement 20 comprises a locking element 21 provided with one or more grooves or recesses 22a-22c which each define a predetermined setting position of the control rod 3a relative to the holder unit 2. Each groove/recess 22a-22c faces towards the control rod 3a. In the example illustrated in FIGS. 2a and 2b, the locking arrangement 20 is arranged to define three different setting positions of the control rod 3a relative to the holder unit 2, and in this case the locking arrangement is provided with three grooves/recesses 22a-22c arranged in line consecutively in a direction parallel with the control rod's longitudinal axis. The control rod 3a is arranged for movement relative to the locking element 21. The locking element 21 is with advantage integrated in a bearing 6a which is one of the bearings via which the control rod 3a is fastened to the holder unit 2. The locking arrangement 20 further comprises two locking balls 23a, 23b arranged in a hollow space 24 in the control rod 3a. These locking balls 23a, 23b are arranged for movement in said hollow space 24 in mutually opposite directions, perpendicular to the longitudinal axis of the control rod, between a protruded position (see FIG. 2a) in which each locking ball 23a, 23b engages in one of said grooves/recesses 22a-22c in the locking element and thereby counteracts movement of the control rod 3a relative to the locking element 21 and the holder unit 2, and a retracted position (see FIG. 2b) in which the locking balls 23a, 23b do not engage in any of said grooves/recesses 22a-22c in the locking element. The locking arrangement 20 also comprises a spring means 25 which is arranged in said hollow space 24 in the control rod and against the action of which the locking balls 23a, 23b are movable from the protruded position to the retracted position. The portion of each locking ball 23a, 23b which is adapted to engaging in said grooves/recesses 22a-22c extends through an aperture 26a, 26b arranged in the control rod's shell surface and connecting to said hollow space 24.

To change from one setting position to another, the control rod 3a has to be moved in its longitudinal direction with such force that the spring force from the spring means 25 is overcome and the locking balls 23a, 23b are brought out of engagement with the respective groove/recess of the locking element. When thereafter the control rod has been moved far enough for the locking balls 23a, 23b to arrive in way of another of the locking element's grooves/recesses 22a-22c, the locking balls will, through the action of the spring means 25, move forward to engage with that groove/recess and thereby counteract further movement of the control rod.

Each groove/recess 22a-22c in the locking element has a guide surface 27 adapted to cooperating with the locking balls 23a, 23b in such a way that the locking balls will, through the action of this guide surface, move from their protruded position to their retracted position in response to a movement of the control rod 3a relative to the locking element 21 starting from a setting position of the control rod with the locking balls 23a, 23b engaged in the respective groove/recess 22a-22c. Said guide surface 27 has with advantage a concave or conical shape as seen in longitudinal section through the locking element 21.

In the example illustrated, the locking element 21 has the shape of a sleeve with an internal space 21a in which part of the control rod 3a is slidably accommodated. In this case each groove/recess 22a-22c is arranged internally in said space 21a and extends one turn round the control rod.

The spring means 25 is adapted to acting upon the locking balls 23a, 23b via an intermediate control ball 28 arranged in said hollow space 24 in the control rod, as illustrated in FIGS. 2a and 2b. This control ball 28 is arranged for movement in said hollow space 24 in the control rod's axial direction, preferably parallel with the control rod's longitudinal axis, and is preloaded by the spring means 25 against the locking balls 23a, 23b so that the locking balls, through the action of the spring means 25 and the control ball 28, are thereby preloaded to assume their protruded position. The spring means 25 takes with advantage the form of a coil spring, preferably a cylindrical coil spring, extending in the control rod's axial direction in said hollow space 24. The spring means 25 is with advantage clamped between the control ball 28 and a bearing surface 29 of said hollow space 24, e.g. by its one end abutting against the control ball 28 and its other end abutting against said bearing surface 29 of the hollow space, as illustrated in FIGS. 2a and 2b.

The control ball 28 is adapted, through the action of the locking balls 23a, 23b and against the action of the spring means 25, to moving in said hollow space 24 from a first position (see FIG. 2a) to a second position (see FIG. 2b) in response to movement of the locking balls 23a, 23b from the protruded position to the retracted position. The locking balls 23a, 23b and the control ball 28 are designed to cooperate both in such a way that the locking balls 23a, 23b will move from the retracted position to the protruded position when the control ball 28, through the action of the spring means 25, moves from the second position to the first position, and in such a way that the control ball 28 will, against the action of the spring means 25, move from the first position to the second position when the locking balls 23a, 23b, through the action of the locking element 21, move from the protruded position to the retracted position.

With advantage, the locking balls 23a, 23b are adapted to holding the control ball 28 in position in the hollow space 24 in the control rod, and the control ball 28 is at the same time adapted, through the action of the spring means 25, to holding the locking balls 23a, 23b in position in this hollow space 24. This can for example be effected in the manner illustrated in FIGS. 2a and 2b. The hollow space 24 in the control rod takes in this case the form of an elongate first hole 24a extending in a radial direction in the control rod 3a, perpendicular to the control rod's longitudinal axis, and an elongate second hole 24b crossing the first hole 24a and extending in an axial direction in the control rod, preferably perpendicular to the first hole 24a. The locking balls 23a, 23b are arranged for movement in the first hole 24a and the control ball 28 is arranged for movement in the second hole 24b, whereby the locking balls are movable in the first hole's longitudinal direction to and fro between the protruded position and the retracted position and the control ball 28 is movable in the second hole's longitudinal direction to and fro between the first position and the second position. The locking balls 23a, 23b abuts against inside wall surfaces 30 of the first hole 24a. In the same way the control ball 28 abuts against inside wall surfaces 31 of the second hole 24b.

The second hole 24b is with advantage a blind hole, whereby the control ball 28 and the spring means 25 are arranged in the portion of the second hole which extends between the first hole 24a and the inner end 29 of the second hole. In the example illustrated, the spring means 25 is clamped between the control ball 28 and the inner end 29 of the second hole. The second hole 24b has with advantage an end aperture 32 facing outwards through which the locking balls 23a, 23b, the control ball 28 and the spring means 25 can be introduced into the hollow space 24. The first hole 24a is a through hole which has at each of its opposite ends an end aperture 26a, 26b facing outwards through which part of one of the locking balls 23a, 23b is adapted to protruding when the locking balls are in the protruded position. The first hole 24a has at each of its end apertures 26a, 26b facing outwards a shoulder 33a, 33b adapted to cooperating with one of the locking balls 23a, 23b in order to limit that locking ball's movement towards the relating end aperture. In the example illustrated, each shoulder 33a, 33b takes the form of a flange extending inwards towards the first hole's centreline at the relating end aperture 26a, 26b.

In the inner portion of the second hole 24b where the spring means 25 is situated, it is advantageous for there to be an air hole 34 as illustrated in FIGS. 2a and 2b. Via this air hole 34, this portion of the second hole 24b will be connected to the surroundings in order to allow air to flow out when the control ball 28 moves from the first position to the second position, and air to flow in when the control ball 28 moves from the second position to the first position.

The locking balls 23a, 23b and the control ball 28 are with advantage of the same size as one another, as illustrated in FIGS. 2a and 2b, and they may for example be made of steel.

The locking balls 23a, 23b, the control ball 28 and the spring means 25 are fitted in the control rod 3a by the successive introduction of the spring means 25, the control ball 28, a first locking ball and a second locking ball into the hollow space 24 via the end aperture 32. These components are thereafter pushed inwards in the second hole 24b until the spring means 25 comes to abut against the second hole's inner end 29 and the locking balls 23a, 23b engage in the recesses 35a, 35b constituted by the first hole 24a.

With advantage, the operating rod 3e is also allocated a locking arrangement of the type described above which defines various predetermined setting positions of the operating rod 3e relative to the holder unit 2.

Figure 4:
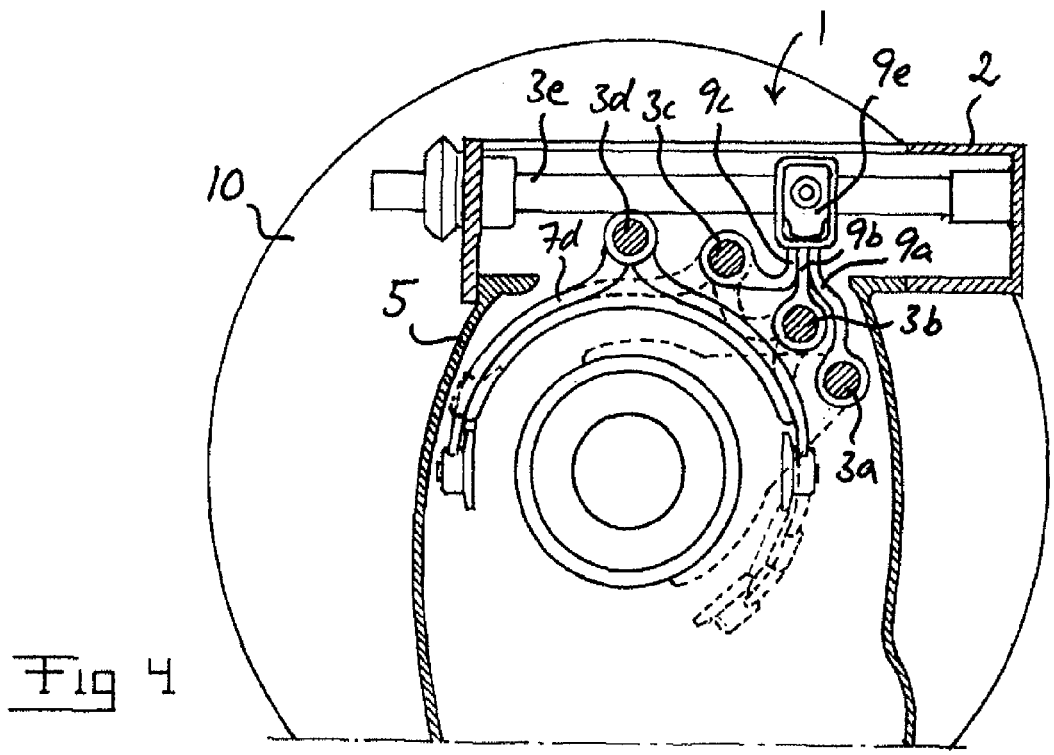
FIG. 4 depicts a schematic partly cutaway view from the rear of the upper portion of a gearbox provided with a control device according to the present invention.

The control device 1 according to the invention is particularly intended to form part of a manual gearbox for a motor vehicle. Part of such a gearbox 10 is illustrated schematically in FIG. 4.

The invention is of course in no way limited to the embodiments described above, since a multiplicity of possibilities for modifications thereof are likely to be obvious to a specialist in the field without thereby having to deviate from the basic concept of the invention as defined in the attached claims.

The invention claimed is:

1. A control device for controlling engagement of a selected gear of a gearbox for a motor vehicle, the control device comprising
    a holder unit, at least one control rod, the control rod is arranged and operable for linear movement in the holder unit, and
    a locking arrangement operable to cooperate with the control rod, the locking arrangement is configured to define one or more predetermined setting positions of the control rod relative to the holder unit, the locking arrangement comprising:

the holder unit including a locking element having a hollow interior defined by a peripheral wall in which one or more grooves or recesses are formed at intervals along the peripheral wall, and each groove or recess defines a predetermined setting position of the control rod relative to the holder unit along the linear movement of the control rod relative to the locking element;

the control rod having a hollow space defined therein extending along a longitudinal axis of the control rod;

two locking balls disposed in the hollow space in the control rod, the hollow space being sized and shaped and the locking balls being sized such that the locking balls are radially movable in the hollow space in respective directions perpendicular to the control rod's longitudinal axis, while the control rod is configured to prevent longitudinal direction movement of the locking balls relative to the control rod;

a spring in the hollow space and biasing against the locking balls for urging the locking balls radially toward a respective protruded position in which each locking ball engages in one of the grooves/recesses in the locking element for resisting longitudinal movement of the control rod relative to the locking element, and permitting the locking balls to move radially to a retracted position in which the locking balls do not engage in any of the grooves/recesses in the locking element; and a control ball disposed in and movable in the hollow space in the control rod's axial direction and preloaded by the spring to be biased against the locking balls so that the locking balls are urged by the spring to be preloaded to assume the protruded position, and the control ball is also operable under the influence of the locking balls and against the action of the spring to move axially in the hollow space in response to movement of the locking balls from the protruded position to the retracted position; and the locking balls and the control ball are of the same size as one another.

2. A control device according to claim 1, wherein the spring comprises a coil spring, extending longitudinally in the hollow space.

3. A control device according claim 1, wherein the hollow space includes a bearing surface and the spring is clamped between the control ball and the bearing surface of the hollow space.

4. A control device according to claim 1, wherein the locking balls are operable to hold the control ball in a longitudinal position in the hollow space, and the control ball is operable through action of the spring to hold the locking balls in respective positions in the hollow space.

5. A control device according to claim 1, wherein to prevent longitudinal movement of the locking balls relative to the control rod, the control rod further comprises a respective first hole for each locking ball extending in a radial direction through the control rod and providing a connection between the hollow space and the interior of the locking element, and an elongate second hole crossing the first holes and extending in a longitudinal direction in the control rod, wherein the locking balls are arranged and operable for radial movement in the first hole and the control ball is arranged for longitudinal movement along the second hole.

6. A control device for controlling engagement of a selected gear of a gearbox for a motor vehicle, the control device comprising a holder unit, at least one control rod, the control rod is arranged and operable for linear movement in the holder unit, and a locking arrangement operable to cooperate with the control rod, the locking arrangement is configured to define one or more predetermined setting positions of the control rod relative to the holder unit, the locking arrangement comprising:

the holder unit including a locking element having a hollow interior defined by a peripheral wall in which one or more grooves or recesses are formed at intervals along the peripheral wall and each groove or recess defines a predetermined setting position of the control rod relative to the holder unit along the linear movement of the control rod relative to the locking element;

the control rod having a hollow space defined therein extending along a longitudinal axis of the control rod;

two locking balls disposed in the hollow space in the control rod, the hollow space being sized and shaped and the locking balls being sized such that the locking balls are radially movable in the hollow space in respective directions perpendicular to the control rod's longitudinal axis, while the control rod is configured to prevent longitudinal direction movement of the locking balls relative to the control rod;

a spring in the hollow space and biasing against the locking balls for urging the locking balls radially toward a respective protruded position in which each locking ball engages in one of the grooves/recesses in the locking element for resisting longitudinal movement of the control rod relative to the locking element, and permitting the locking balls to move radially to a retracted position in which the locking balls do not engage in any of the grooves/recesses in the locking element; and a control ball disposed in and movable in the hollow space in the control rod's axial direction and preloaded by the spring to be biased against the locking balls so that the locking balls are urged by the spring to be preloaded to assume the protruded position, and the control ball is also operable under the influence of the locking balls and against the action of the spring to move axially in the hollow space in response to movement of the locking balls from the protruded position to the retracted position;

to prevent longitudinal movement of the locking balls relative to the control rod, the control rod further comprises a respective first hole for each locking ball extending in a radial direction through the control rod and providing a connection between the hollow space and the interior of the locking element, and an elongate second hole crossing the first holes and extending in a longitudinal direction in the control rod, wherein the locking balls are arranged and operable for radial movement in the first hole and the control ball is arranged for longitudinal movement along the second hole; and the second hole is a blind hole with an inner end and the control ball and the spring are arranged in a portion of the second hole which extends between the second hole's inner end and the first hole.

7. A control device for controlling engagement of a selected gear of a gearbox for a motor vehicle, the control device comprising a holder unit, at least one control rod, the control rod is arranged and operable for linear movement in the holder unit, and a locking arrangement operable to cooperate with the control rod, the locking arrangement is configured to define one or more predetermined setting positions of the control rod relative to the holder unit,
the locking arrangement comprising:
the holder unit including a locking element having a hollow interior defined by a peripheral wall in which one or more grooves or recesses are formed at intervals along the peripheral wall, and each groove or recess defines a predetermined setting position of the control rod relative to the holder unit along the linear movement of the control rod relative to the locking element;
the control rod having a hollow space defined therein extending along a longitudinal axis of the control rod;
two locking balls disposed in the hollow space in the control rod, the hollow space being sized and shaped and the locking balls being sized such that the locking balls are radially movable in the hollow space in respective directions perpendicular to the control rod's longitudinal axis, while the control rod is configured to prevent longitudinal direction movement of the locking balls relative to the control rod;
a spring in the hollow space and biasing against the locking balls for urging the locking balls radially toward a respective protruded position in which each locking ball engages in one of the grooves/recesses in the locking element for resisting longitudinal movement of the control rod relative to the locking element, and permitting the locking balls to move radially to a retracted position in which the locking balls do not engage in any of the grooves/recesses in the locking element; and
a control ball disposed in and movable in the hollow space in the control rod's axial direction and preloaded by the spring to be biased against the locking balls so that the locking balls are urged by the spring to be preloaded to assume the protruded position, and the control ball is also operable under the influence of the locking balls and against the action of the spring to move axially in the hollow space in response to movement of the locking balls from the protruded position to the retracted position;
to prevent longitudinal movement of the locking balls relative to the control rod, the control rod further comprises a respective first hole for each locking ball extending in a radial direction through the control rod and providing a connection between the hollow space and the interior of the locking element, and an elongate second hole crossing the first holes and extending in a longitudinal direction in the control rod, wherein the locking balls are arranged and operable for radial movement in the first hole and the control ball is arranged for longitudinal movement along the second hole; and
the second hole has an end aperture facing outwards of the second hole in a longitudinal direction through which the locking balls, the control ball and the spring may introduced into the hollow space.

8. A control device for controlling engagement of a selected gear of a gearbox for a motor vehicle, the control device comprising
a holder unit, at least one control rod, the control rod is arranged and operable for linear movement in the holder unit, and
a locking arrangement operable to cooperate with the control rod, the locking arrangement is configured to define one or more predetermined setting positions of the control rod relative to the holder unit,
the locking arrangement comprising:
the holder unit including a locking element having a hollow interior defined by a peripheral wall in which one or more grooves or recesses are formed at intervals along the peripheral wall, and each groove or recess defines a predetermined setting position of the control rod relative to the holder unit along the linear movement of the control rod relative to the locking element;
the control rod having a hollow space defined therein extending along a longitudinal axis of the control rod;
two locking balls disposed in the hollow space in the control rod, the hollow space being sized and shaped and the locking balls being sized such that the locking balls are radially movable in the hollow space in respective directions perpendicular to the control rod's longitudinal axis, while the control rod is configured to prevent longitudinal direction movement of the locking balls relative to the control rod;
a spring in the hollow space and biasing against the locking balls for urging the locking balls radially toward a respective protruded position in which each locking ball engages in one of the grooves/recesses in the locking element for resisting longitudinal movement of the control rod relative to the locking element, and permitting the locking balls to move radially to a retracted position in which the locking balls do not engage in any of the grooves/recesses in the locking element; and
a control ball disposed in and movable in the hollow space in the control rod's axial direction and preloaded by the spring to be biased against the locking balls so that the locking balls are urged by the spring to be preloaded to assume the protruded position, and the control ball is also operable under the influence of the locking balls and against the action of the spring to move axially in the hollow space in response to movement of the locking balls from the protruded position to the retracted position;
to prevent longitudinal movement of the locking balls relative to the control rod, the control rod further comprises a respective first hole for each locking ball extending in a radial direction through the control rod and providing a connection between the hollow space and the interior of the locking element, and an elongate second hole crossing the first holes and extending in a longitudinal direction in the control rod, wherein the locking balls are arranged and operable for radial movement in the first hole and the control ball is arranged for longitudinal movement along the second hole; and
the first holes is a through hole through the control rod and with opposite ends, and at each of its opposite ends the through hole has an end aperture facing radially outwards through which part of one of the locking balls is adapted to protrude when the locking balls are in the protruded position, and the first hole has at each of its outward facing end apertures a shoulder for cooperating with one of the locking balls in order to limit that locking ball's movement towards the respective end aperture.

9. A gearbox for a motor vehicle comprising a plurality of selectable operating gear for vehicle operation;
at least one control rod operable for controlling selection of gears in the gearbox, and
a control device according to claim 1.

* * * * *